No. 790,914. PATENTED MAY 30, 1905.
H. P. PALIN.
TIRE PROTECTOR.
APPLICATION FILED OCT. 25, 1904.

Witnesses:
J. Henry Parker
Oscar F. Hill

Inventor:
Henry P. Palin
by Wm. A. Copeland
Attorney.

No. 790,914. Patented May 30, 1905.

UNITED STATES PATENT OFFICE.

HENRY P. PALIN, OF NORTH ATTLEBORO, MASSACHUSETTS.

TIRE-PROTECTOR.

SPECIFICATION forming part of Letters Patent No. 790,914, dated May 30, 1905.

Application filed October 25, 1904. Serial No. 229,962.

*To all whom it may concern:*

Be it known that I, HENRY P. PALIN, of North Attleboro, in the county of Bristol and State of Massachusetts, have invented certain new and useful Improvements in Tire-Protectors, of which the following is a specification.

The object of the invention is to provide a device for strengthening and protecting weak places or repairing broken places in the shoe or outer tube of pneumatic tires and a simple secure means of fastening the device in position.

The invention will now be fully described by reference to the accompanying drawings, and the novel features thereof will be particularly pointed out in the claims at the close of the specification.

Figure 2:
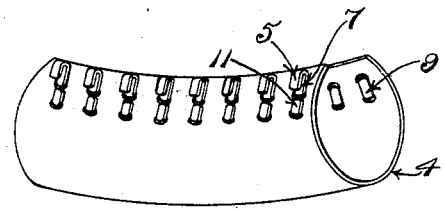
Figure 6:
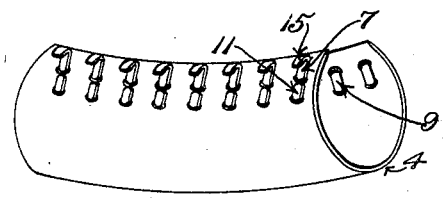
Figure 1:
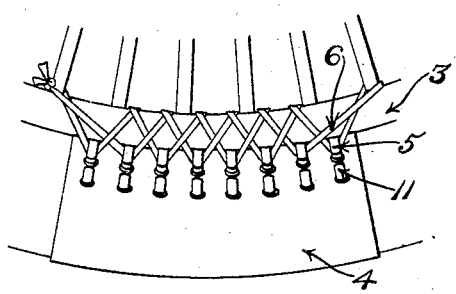
Figure 5:
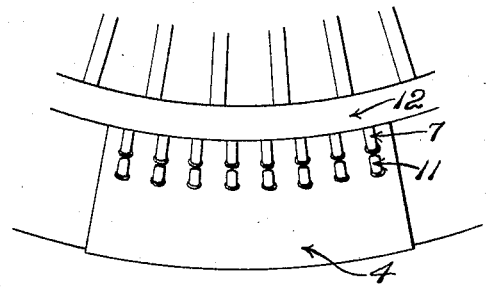
Figure 3:
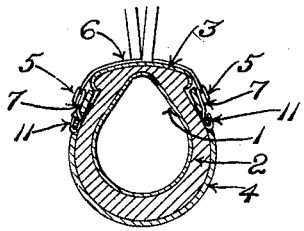
Figure 7:
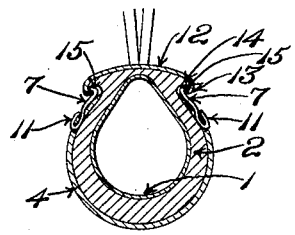
Figure 4:
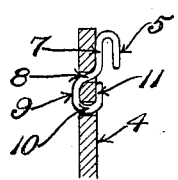
Figure 8:
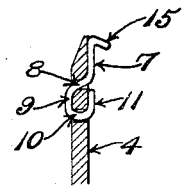

In the drawings, Figure 1 is a side elevation of a portion of a wheel having my protector attached to the tire. Fig. 2 is a perspective view of a protector embodying the invention, detached from a tire, bent up into the position it occupies when on the tire. Fig. 3 is a cross-section of Fig. 1. Fig. 4 is a sectional detail view of a portion of a protector, showing how one of the lacing-hooks is secured to the leather. Fig. 5 is a side elevation showing a protector having the hooks attached to the leather in the same manner as in Fig. 1, but of slightly-different bend, so as to be attached to the tire without the use of lacing-cord. Fig. 6 is a perspective view of the protector shown in Fig. 5 removed from the tire. Fig. 7 is a cross-section of Fig. 5.
Fig. 8 is a sectional detail showing one of the fastening-hooks attached to the leather.

Referring now to the drawings, 1 represents the inner tube, 2 the shoe, and 3 the rim, of a wheel having my improved protector 4 attached. The protector-sleeve 4 is composed of a band of any suitable tough flexible material, rawhide being preferred. It is cut to suitable length, according to the extent of surface desired to have protected, and is of sufficient width according to the size of the tire, so that when bent up into the shape shown in Fig. 2 to attach it to the wheel it will inclose a sufficient portion of the tire to protect the weak portion. The hooks 5 are secured to the leather sleeve 4 in such manner that the eye of the hook is on the outer side of the sleeve.

When the sleeve is laced onto the tire, as shown in Figs. 1 and 3, if the eye of the hook extended above the edge of the sleeve it would be drawn by the lacing 6 into contact with the rim 3 and produce abrasion. In order to avoid such abrasion, the hooks should be secured to the sleeve far enough below the edge, so that the upwardly-extending eye will not project above the edge of the sleeve, and when the lacing is drawn tight it will cause the shank of the hook to hug closely against the sleeve instead of coming in contact with the shoe or the rim.

The preferred form of hook and method of clenching it to the sleeve is that shown in Figs. 1 to 4. The upper portion 7 of the shank of the hook—that is, the portion which forms a part of the eye and lies against the leather—should lie substantially parallel with it. There are formed in the leather two holes, one above the other, for each hook. The shank of the hook is bent at the bottom of the straight bearing portion 7 and forms a transverse or slightly-inclined portion 8, which passes through the upper hole to the inner side of the sleeve, thence a downwardly-extending portion 9, bearing against the inner side of the sleeve, thence a reversely-transverse bend 10, passing through the lower hole, and thence an upturned end 11 on the outer face of the sleeve, thus forming a loop, which securely fastens the hook to the sleeve. The tighter the lacing is drawn up the more will it cause both the front portion 7 and the rear portion 9 of the shank to hug and sink into the leather instead of causing abrasion.

In the form shown in Figs. 5, 6, and 7 the sleeve is shown adapted for attachment to the wheel without the use of lacing-cord, the rim 12 being formed with a flange 13 to fit a flange in the shoe 14. The hooks 15 are secured to the sleeve in the same manner as in the form already described. The upper ends of the hooks are bent in such form as to engage the flange 13, as shown in Fig. 7, and the sleeve is thus held securely in position without the use of lacing.

What I claim is—

1. A tire-protector consisting of a band of flexible material having a row of lacing-hooks secured thereto near each of two opposite edges, each hook being far enough back not to project beyond the edge, the band being formed with two fastening-holes for each hook, one farther from the edge than the other, said hooks being each formed of a single wire bent to form a hook portion, and a shank which lies against the outer face of the band and an extension for securing it to the band, said shank being secured to the band by bending said extension to pass back through the upper hole in the band, then bending it down along the inner face of the band, then bending it to pass through the lower hole to the outer face again, and then turning it up against the outer face in line with the first portion of the shank, and a lacing-cord which engages said hooks.

2. A tire-protector consisting of a band of flexible material bent to form a sleeve and having hooks secured thereto near the edges, the band being formed with two fastening-holes for attachment of each hook to the band, said hooks being each formed of a single wire bent to form a hook portion and a shank which is secured to the band by bending it and passing it through one hole in the band, then bending it down against the rear face of the band away from the edge, then bending and passing it through the second hole to the front face again, then bending it up against the front face in line with the neck of the shank.

In testimony whereof I have affixed my signature in presence of two witnesses.

HENRY P. PALIN.

Witnesses:
FRANK E. BOSWORTH,
FRED B. BYRAM.